April 1, 1952 R. C. STELMACH 2,591,314
DEVICE FOR SAFETY-CHECKING THE ALIGNMENT OF PATTERNS
Filed Aug. 5, 1949 2 SHEETS—SHEET 1
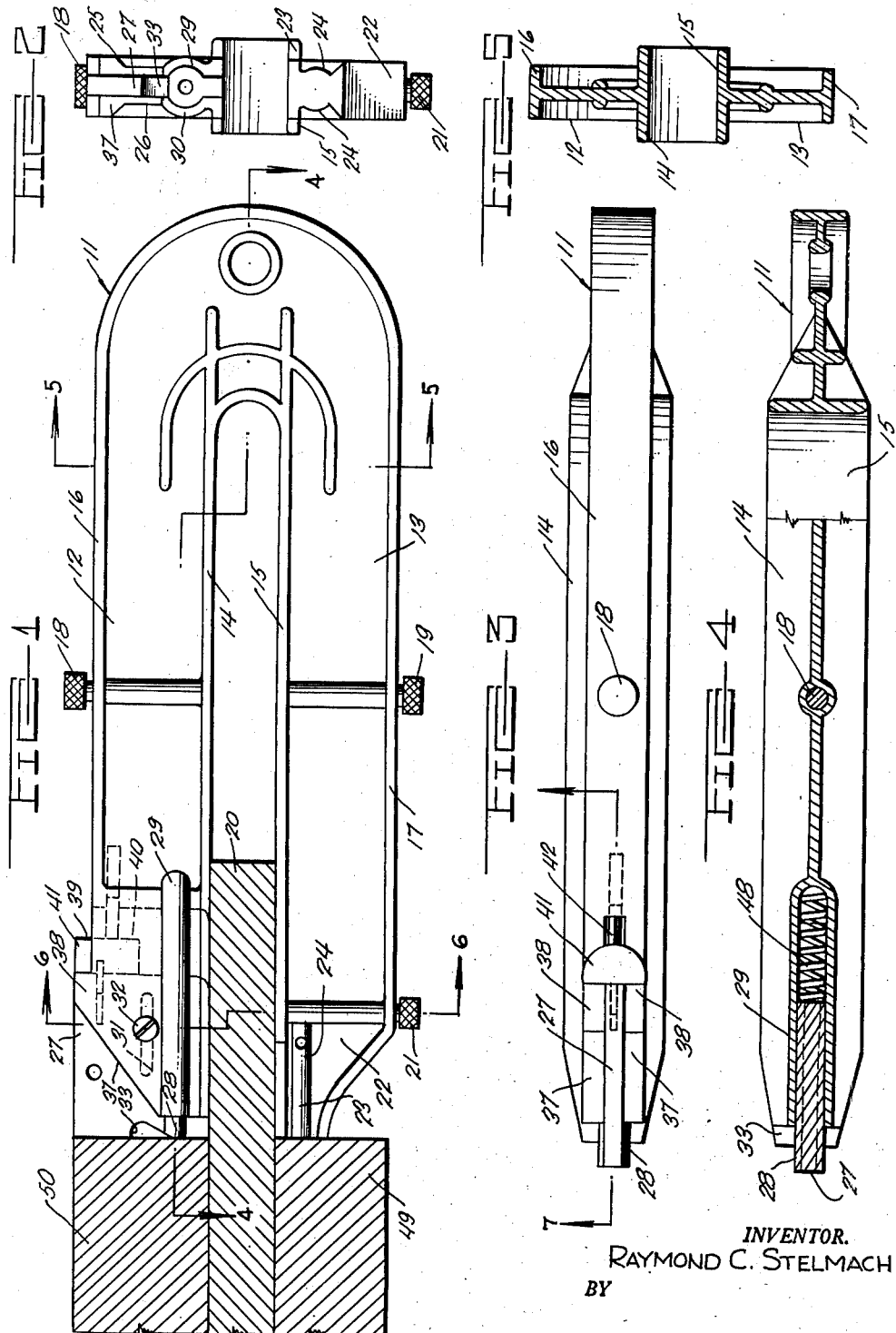
INVENTOR.
RAYMOND C. STELMACH
BY
McMorrow, Berman & Davidson
ATTORNEYS

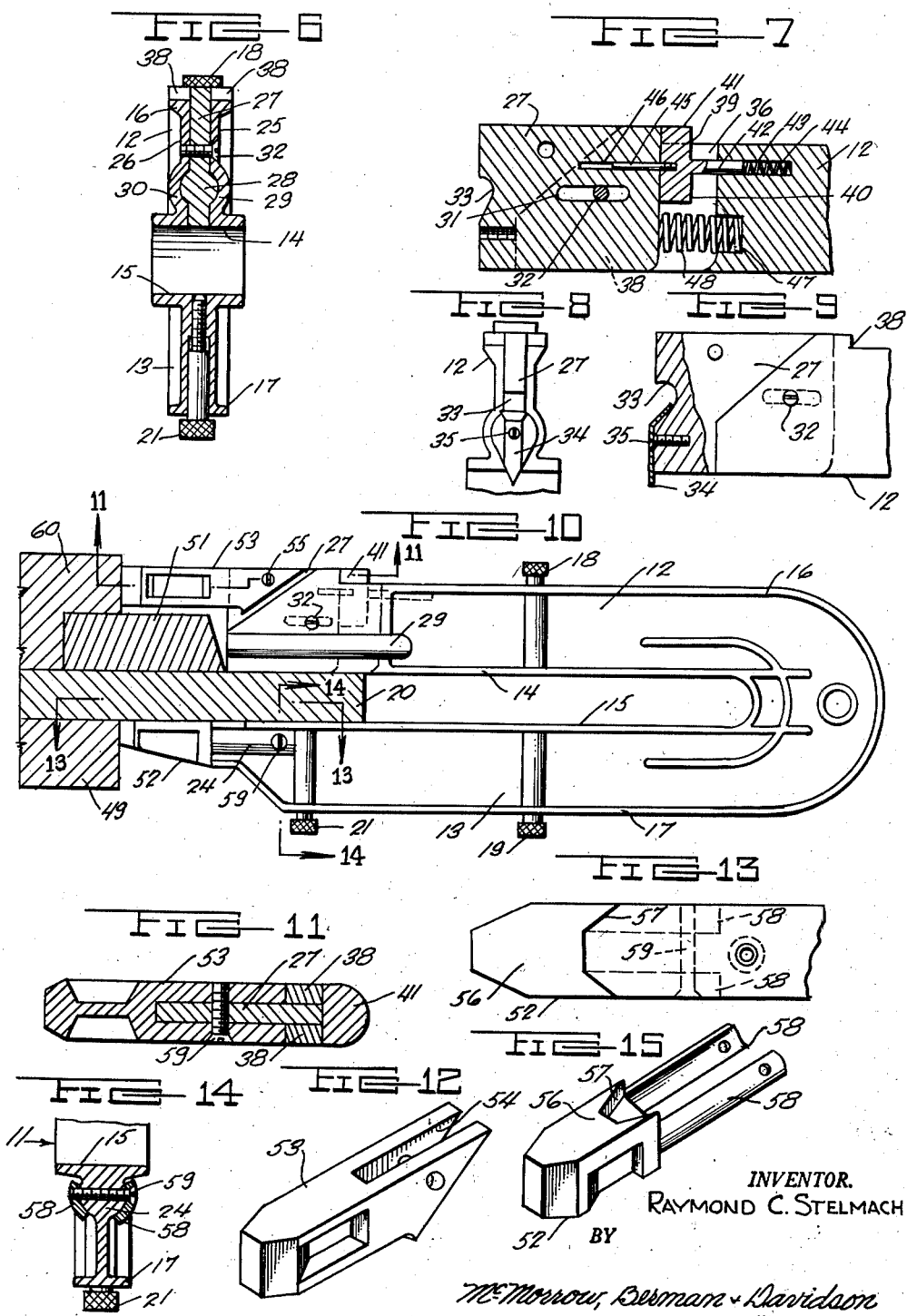

Patented Apr. 1, 1952

2,591,314

UNITED STATES PATENT OFFICE 2,591,314

DEVICE FOR SAFETY CHECKING THE ALIGNMENT OF PATTERNS

Raymond C. Stelmach, Harvey, Ill.

Application August 5, 1949, Serial No. 108,802

6 Claims. (Cl. 33—180)

This invention relates to gauge devices, and more particularly to a device for checking the match or alignment of molding patterns on opposite sides of a board or plate.

A main object of the invention is to provide a novel and improved gauge device for checking the alignment or matching of opposing portions of casting patterns, said device being very simple in construction, very easy to manipulate, and providing a means of obtaining accurate matching of opposite portions of a molding pattern, whereby mis-match of sections of a casting is eliminated.

A further object of the invention is to provide an improved device for aligning or matching patterns on opposite sides of a board or plate, said device being easy to adjust, providing visual indications of the relative positions of patterns on opposite sides of said board or plate, providing a rapid means for obtaining exact alignment of the opposing portions of casting patterns, and greatly improving the accuracy obtainable in matching up casting molds.

Further objects and advantages of the invention will become apparent from the following description and claims, and from the accompanying drawings, wherein:

Figure 1 is an elevational view of a gauge device constructed in accordance with the present invention, shown engaged over a board or plate and in contact with opposing pattern members mounted on opposite sides of the board or plate;

Figure 2 is a front elevational view of the gauge device of Figure 1;

Figure 3 is a top plan view of the gauge device of Figure 1;

Figure 4 is a horizontal cross-sectional view taken through the gauge device on line 4—4 of Figure 1;

Figure 5 is a vertical cross-sectional view taken on line 5—5 of Figure 1;

Figure 6 is a vertical cross-sectional view taken on line 6—6 of Figure 1;

Fiugre 7 is an enlarged cross-sectional detail view taken on line 7—7 of Figure 3;

Figure 8 is an end elevational detail view of the upper arm of the gauge device of Figure 1, showing a scribing member secured thereon;

Figure 9 is a fragmentary elevational detail view, partly in cross-section, of the end of the upper arm of the gauge device of Figure 1, showing the scribing attachment of Figure 8 secured thereon;

Figure 10 is a side elevational view of the gauge device of Figure 1, showing extensions secured to the upper and lower arms thereof to avoid interference with core elements of the pattern;

Figure 11 is an enlarged cross-sectional view taken on line 11—11 of Figure 10;

Figure 12 is a perspective view of the upper extension element employed in Figure 10;

Figure 13 is an elevational detail view taken on line 13—13 of Figure 10;

Figure 14 is an enlarged cross-sectional detail view taken on line 14—14 of Figure 10;

Figure 15 is a perspective view of the lower extension employed in Figure 10;

Referring to the drawings, the gauge device is designated generally at 11 and comprises a generally U-shaped body having the parallel respective upper and lower arms 12 and 13. The arms 12 and 13 are generally I shape in cross-section, as shown in Figure 5, the inner flanges, shown at 14 and 15, of the arms being wider than the outer flanges thereof, shown respectively at 16 and 17. Threaded through the webs of the respective arms are the aligned vertical clamping screws 18 and 19, which may be employed for clamping the device to a matching board, such as shown at 20, when said board is inserted between the arms 12 and 13. Adjacent its outer end, the lower arm 13 is provided with an additional vertical clamping screw 21 threaded through the web thereof. The outer end of lower arm 13 is reduced in depth, as shown at 22, the flange 15 being tapered toward said outer end. Below the tapered flange portion, the web of the lower arm 13 is formed with opposing rounded horizontal ribs 24, 24.

The outer end of the top arm 12 is formed with parallel, laterally spaced wall elements 25 and 26, defining a vertically and longitudinally elongated slot 36 therebetween, in which is slidably positioned a blade member 27. Blade member 27 is formed on its opposite sides with enlarged longitudinal ribs 28 which are slidably received in correspondingly-shaped, longitudinal channels 29 and 30 formed in the wall elements 25 and 26. The blade member 27 is formed with a longitudinal slot 31. A transverse pin 32 passes through wall element 25 and slot 31 and is threaded into wall element 26, whereby the blade member 27 is secured against withdrawal from between the wall elements 25 and 26. The forward or outer edge of blade member 27 is formed with a notch 33. A pointed depending scriber 34 may be secured to the lower portion of said front edge, below notch 33, as by a screw 35, in the manner illustrated in Figures 8 and 9.

As shown in Figure 1, the wall elements 25 and 26 are forwardly and downwardly inclined at their top edges, as shown at 37, and extend above the top plane of flange 16 to define rearwardly-facing abutment shoulders 38. Designated at 39 is a T-shaped member having its depending portion 40 slidably received in slot 36 behind the rear edge of blade member 27 and having its top head portion 41 transversely overlying the top edges of wall elements 25 and 26 behind the shoulders 38. Secured to the depending portion 40 is a longitudinally-extending rod element 42 slidably and loosely received in a longitudinal bore 43 formed in arm 12, and positioned in said bore behind rod element 42 is a coiled spring 44. Spring 44 biases T-shaped member 39 forwardly. Secured to T-shaped member 39 is a forwardly-extending, longitudinal pin 45 slidably received in a longitudinal bore 46 formed in blade member 27, said pin acting to guide member 39 for longitudinal movement with respect to blade member 27. Seated in a recess 47 formed in the lower portion of arm 12 is a longitudinally-acting, coiled spring 48 bearing forwardly on the rear edge of blade member 27 and biasing said blade member forwardly with respect to arm 12. Forward movement of T-shaped member 39 is limited either by the engagement thereof with the rear edge of blade member 27 or by the engagement of the head portion 41 of T-shaped member 39 with the abutment shoulders 38, 38 of wall members 25 and 26. The length of blade member 27 is such that when the T-shaped member 39 simultaneously engages the rear edge of the blade member and the abutment shoulders 38, the front edge of the blade member is in precise vertical alignment with the front edge of the lower arm 13.

In employing the device, the lower pattern, shown at 49 in Figure 1, is first secured to the board 20 and the board is inserted between the arms 12 and 13. The board is moved inwardly until the front edge of lower arm 13 abuts the margin of the lower pattern 49. The board is then clamped by means of the clamping screw 21. The upper pattern, shown at 50, is then positioned on the board and moved thereon in abutment with the front edge of the blade member 27 until the head portion 41 of T-shaped member 39 is seen to simultaneously engage the rear edge of the blade member 27 and the shoulders 38, as shown, for example, in Figure 3. This places the upper pattern in alignment with the lower pattern, and said upper pattern may then be secured to the matching board 20 in this position. When the scriber 34 is employed, the board 20 may be merely marked with a scratch mark to indicate the correct position of the margin of the upper pattern thereon, and the upper pattern may be later secured to the board by fitting it within the area defined by a plurality of scribe marks obtained by a number of gauging operations, as above defined. Said gauging operations may be made merely by the use of the lower pattern 49 as a template, scribe marks being made at various positions around the lower pattern, in each instance at a position of the blade member 27 wherein the head portion 41 is in simultaneous abutment with the rear edge of the blade member and the shoulders 38, 38.

Certain patterns may involve the use of core prints, such as shown at 51, mounted on the board 20 and obstructing forward movement of the blade member as employed in Figure 1. In such cases, extension members, shown at 52 and 53, are secured respectively to the forward end of the lower arm 13 and to the blade member 27, the extension 53 being upwardly offset so as to extend forwardly over the coreprint 51, thereby avoiding contact therewith. As shown in Figure 12, the extension member 53 is formed with a notch 54 adapted to receive the upper forward corner of the blade member 27. A screw bolt 55 extends through the rear portion of the extension member and the upper forward corner of the blade member in the manner shown in Figure 11, the screw bolt being threaded into the upper portion of the extension member, as viewed in Figure 11. The extension member 52 comprises a body portion 56 formed with a tapered rear notch 57 adapted to receive the top of bottom arm 13 and is provided with rearwardly extending opposing channeled fingers 58, 58 adapted to embrace the side ribs 24 of bottom arm 13, as shown in Figure 14. A screw bolt 59 is employed to fasten the extension member to said bottom arm, said screw bolt passing through one of the fingers 58, through the ribs 24, 24 and being threaded into the other finger 58, as shown in Figure 14. The distance from the transverse end surface of notch 57 to the forward transverse surface of body portion 56 of extension member 52 is the same as the distance from the transverse end surface of the notch 54 to the forward transverse end surface of the extension member 53, whereby a top pattern 60 may be aligned on board 20 with a bottom pattern 49 secured to the bottom of said board, as shown in Figure 10, by following the same procedure as described in connection with Figure 1.

While a specific embodiment of a gauge device for checking the alignment and matching of opposing pattern elements with respect to a board or plate has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a device for registering patterns on opposite sides of a moldboard, a frame comprising a pair of parallelly spaced arms having free outer ends, means fixing said arms in parallel relation with the free end of one of said arms reaching beyond the free end of the other arm for engaging an edge of a pattern on a side of a moldboard positioned between said arms, a blade mounted on the other arm to slide therealong, said blade having an outer end and being arranged to occupy a retracted position in which the outer end of said blade is flush with the free outer end of said other arm and to occupy a projected position in which the outer end of the blade is positioned outwardly beyond the free outer end of said other arm, the outer end of the blade thereby indicating the proper position for the edge of a pattern on the opposite side of the moldboard to register with the edge of the first mentioned pattern.

2. In a device for registering patterns on opposite sides of a moldboard, a frame comprising a pair of parallelly spaced arms having free outer ends, means fixing said arms in parallel relation with the free end of one of said arms reaching beyond the free end of the other arm for engaging an edge of a pattern on a side of a moldboard positioned between said arms, a blade mounted on the other arm to slide therealong said blade having an outer end and being arranged to occupy a retracted position in which the outer end of said blade is flush with the free outer end of said other arm and to occupy a projected position in which the outer end of the blade is positioned outwardly beyond the free outer end of said other arm, the outer end of the blade thereby indicating the proper position for the edge of a pattern on the opposite side of the moldboard to register with the edge of the first mentioned pattern, said blade having a scriber on its outer end serving to mark the moldboard to how the proper position for the edge of the pattern on the corresponding side of the moldboard.

3. In a device for registering patterns on opposite sides of a moldboard, a frame comprising a pair of parallelly spaced arms having free outer ends, means fixing said arms in parallel relation with the free end of one of said arms reaching beyond the free end of the other arm for engaging an edge of a pattern on a side of a moldboard positioned between said arms, a blade mounted on the other arm to slide therealong, said blade having an outer end and being arranged to occupy a retracted position in which the outer end of said blade is flush with the free outer end of said other arm and to occupy a projected position in which the outer end of the blade is positioned outwardly beyond the free outer end of said other arm, the outer end of the blade thereby indicating the proper position for the edge of a pattern on the opposite side of the moldboard to register with the edge of the first mentioned pattern, and means for positioning said blade in projected position comprising spring means acting between said blade and a portion of said other arm.

4. In a device for registering patterns on opposite sides of a moldboard, a frame comprising a pair of parallelly spaced arms having free outer ends, means fixing said arms in parallel relation with the free end of one of said arms reaching beyond the free end of the other arm for engaging an edge of a pattern on a side of a moldboard positioned between said arms, a blade mounted on the other arm to slide therealong, said blade having an outer end and being arranged to occupy a retracted position in which the outer end of said blade is flush with the free outer end of said other arm and to occupy a projected position in which the outer end of the blade is positioned outwardly beyond the free outer end of said other arm, the outer end of the blade thereby indicating the proper position for the edge of a pattern on the opposite side of the moldboard to register with the edge of the first mentioned pattern, and means for positioning said blade in projecting position comprising first spring means compressed between the inner end of said blade and a portion of said other arm located inwardly from said blade.

5. In a device for registering patterns on opposite sides of a moldboard, a frame comprising a pair of parallelly spaced arms having free outer ends, means fixing said arms in parallel relation with the free end of one of said arms reaching beyond the free end of the other arm for engaging an edge of a pattern on a side of a moldboard positioned between said arms, a blade mounted on the other arm to slide therealong, said blade having an outer end and being arranged to occupy a retracted position in which the outer end of said blade is flush with the free outer end of said other arm and to occupy a projected position in which the outer end of the blade is positioned outwardly beyond the free outer end of said other arm, the outer end of the blade thereby indicating the proper position for the edge of a pattern on the opposite side of the moldboard to register with the edge of the first mentioned pattern, and means for positioning said blade in projecting position comprising first spring means compressed between the inner end of said blade and a portion of said other arm located inwardly from said blade, shoulder means positioned on said other arm to be aligned with the inward end of said blade with said blade in a partially retracted position, as abutment member mounted on said other arm inwardly of said shoulder means for longitudinal movement relative to said other arm and to said blade toward and away from engagement with said shoulder means, and second spring means compressed between said abutment member and said portion of said other arm serving to bias said abutment member toward said shoulder means so as to engage the inward end of said blade in a further retracted position of said blade wherein the inward end of said blade is inwardly of said shoulder means in a manner to project said blade outwardly with respect to said other arm independently of said first spring means until said abutment member is engaged with said shoulder means.

6. In a device for registering patterns on opposite sides of a moldboard, a frame comprising a pair of parallelly spaced arms having free outer ends, means fixing said arms in parallel relation with the free end of one of said arms reaching beyond the free end of the other arm for engaging an edge of a pattern on a side of a moldboard position between said arms, a blade mounted on the other arm to slide therealong, said blade having an outer end and being arranged to occupy a retracted position in which the outer end of said blade is flush with the free outer end of said other arm and to occupy a projected position in which the outer end of the blade is positioned outwardly beyond the free outer end of said other arm, the outer end of the blade thereby indicating the proper position for the edge of a pattern on the opposite side of the moldboard to register with the edge of the first mentioned pattern, and means for positioning said blade in projected position comprising spring means acting between said blade and a portion of said other arm, said blade and the free outer end of said one arm having outwardly projecting extensions removably mounted thereon.

RAYMOND C. STELMACH.

REFERENCES CITED

The following references are of record in the file of this patent:

UNITED STATES PATENTS

| Number | Name | Date |
|---|---|---|
| 1,319,127 | Turner | Oct. 21, 1919 |
| 2,373,927 | Turner | Apr. 17, 1945 |